United States Patent [19]
Ochitani

[11] Patent Number: 5,940,830
[45] Date of Patent: Aug. 17, 1999

[54] DISTRIBUTED DOCUMENT MANAGEMENT SYSTEM

[75] Inventor: Ryo Ochitani, Kawasaki, Japan

[73] Assignee: Fujitsu Limited, Kawasaki, Japan

[21] Appl. No.: 08/828,691

[22] Filed: Mar. 31, 1997

[30] Foreign Application Priority Data

Sep. 5, 1996 [JP] Japan .................................... 8-234890

[51] Int. Cl.[6] .................................................. G06F 17/30
[52] U.S. Cl. ................................................. 707/10; 707/2
[58] Field of Search ........................... 707/10, 104, 200, 707/203, 204, 9, 2

[56] References Cited

U.S. PATENT DOCUMENTS

| | | | |
|---|---|---|---|
| 5,062,056 | 10/1991 | Janis et al. ............................... | 364/200 |
| 5,132,900 | 7/1992 | Gilchrist et al. ........................... | 707/9 |
| 5,142,663 | 8/1992 | Janis et al. ............................... | 707/205 |
| 5,345,586 | 9/1994 | Hamala et al. .......................... | 395/650 |
| 5,448,729 | 9/1995 | Murdock ................................. | 707/203 |
| 5,600,831 | 2/1997 | Levy et al. .................................. | 707/2 |
| 5,717,879 | 2/1998 | Moran et al. ........................... | 345/339 |
| 5,764,906 | 6/1998 | Edelstein et al. .................. | 395/200.49 |
| 5,813,001 | 9/1998 | Bennett ....................................... | 707/3 |
| 5,835,757 | 11/1998 | Oulid-Aissa .............................. | 707/10 |
| 5,864,679 | 1/1999 | Kanai et al. ....................... | 395/200.68 |

*Primary Examiner*—Thomas G. Black
*Assistant Examiner*—Charles L. Rones
*Attorney, Agent, or Firm*—Staas & Halsey LLP

[57] ABSTRACT

When an operation such as a move, name change, copy, deletion, etc. is performed for document data, a history manager stores history information of the operation in a history table. Upon receipt of the notification that retrieval of the document data is unsuccessfully made from a document processing application, the history manager searches the history table, and returns new identification information stored after an update operation is performed. The document processing application obtains the new identification information, and retrieves the corresponding document data from a file system.

20 Claims, 20 Drawing Sheets

| OPERATION TYPE | TARGET IDENTIFICATION INFORMATION |
|---|---|
| MOVE | IDENTIFICATION INFORMATION OF MOVE SOURCE, IDENTIFICATION INFORMATION OF MOVE DESTINATION |
| NAME CHANGE | IDENTIFICATION INFORMATION BEFORE CHANGE, IDENTIFICATION INFORMATION AFTER CHANGE |
| DELETION | IDENTIFICATION INFORMATION TO BE DELETED |
| COPY | IDENTIFICATION INFORMATION OF COPY SOURCE, IDENTIFICATION INFORMATION OF COPY DESTINATION |
| DIVISION | IDENTIFICATION INFORMATION OF DIVISION SOURCE, IDENTIFICATION INFORMATION OF DIVISION DESTINATION 1,···, IDENTIFICATION INFORMATION OF DIVISION DESTINATION n |
| MERGING | IDENTIFICATION INFORMATION OF MERGING SOURCE 1,···, IDENTIFICATION INFORMATION OF MERGING SOURCE n, IDENTIFICATION INFORMATION OF MERGING DESTINATION |

FIG. 7

| OPERATION TYPE | IDENTIFICATION INFORMATION OF UPDATE SOURCE | IDENTIFICATION INFORMATION OF UPDATE DESTINATION |
|---|---|---|
| MOVE | /Doc/TextC | /New/TextD |
| NAME CHANGE | /Doc/TextA | /Doc/TextB |
| MOVE | /Doc/TextB | /DocNew/TextB |
| COPY | /DocNew/TextB | /DocBackup/TextB |
| ⋮ | ⋮ | ⋮ |

FIG. 8

| OPERATION TYPE | IDENTIFICATION INFORMATION OF UPDATE SOURCE | IDENTIFICATION INFORMATION OF UPDATE DESTINATION |
|---|---|---|
| ⋮ | ⋮ | ⋮ |
| MOVE | /example/doc/text | /example/newdoc/newtext |
| ⋮ | ⋮ | ⋮ |

HISTORY INFORMATION "X"

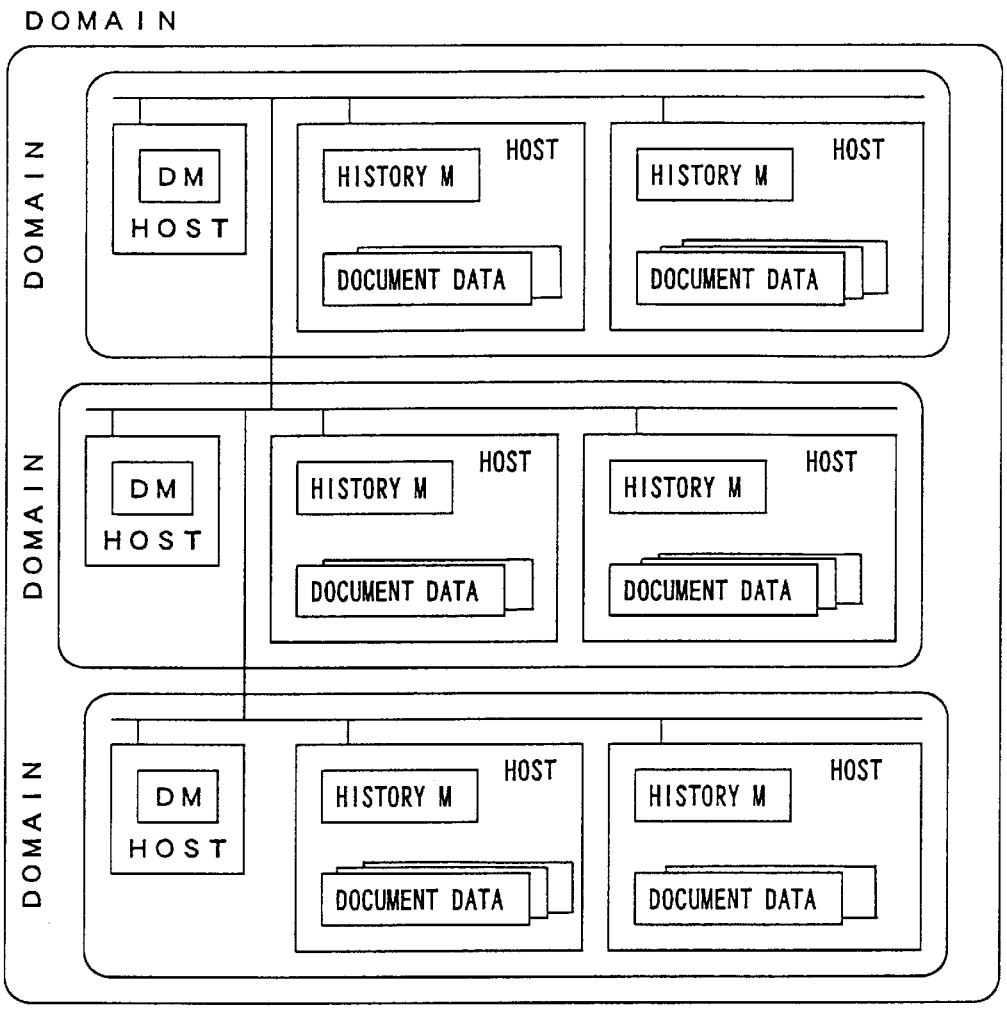
FIG. 12A
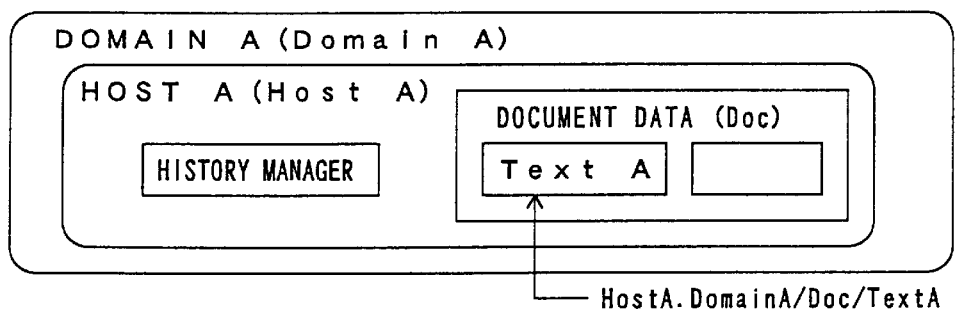
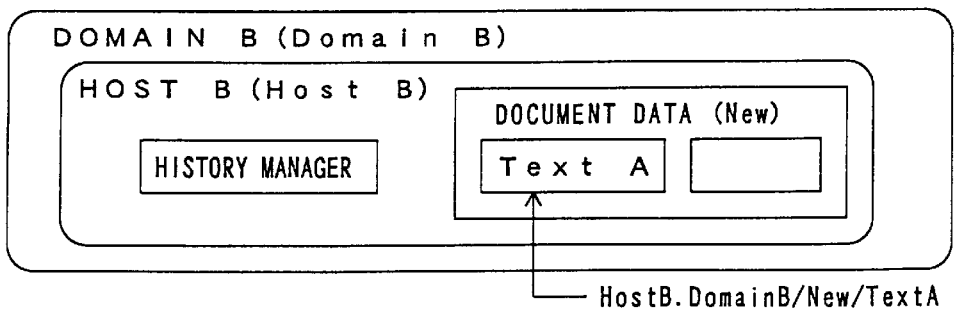
FIG. 12B

| OPERATION TYPE | IDENTIFICATION INFORMATION OF UPDATE SOURCE | IDENTIFICATION INFORMATION OF UPDATE DESTINATION |
|---|---|---|
| MOVE | HostA.DomainA/doc/TextA | HostB.DomainB/new/TextA |
| NAME CHANGE | HostC/doc/TextA | HostC/doc/TextB |
| MOVE | HostB/doc/TextB | Hostb/docnew/TextB |
| COPY | HostA.DomainB/doc/TextB | HostD.DomainC/backup/TextB |
| ⋮ | ⋮ | ⋮ |

F I G. 1 3

| OPERATION TYPE | TARGET IDENTIFICATION INFORMATION |
|---|---|
| MOVE | IDENTIFICATION NAME OF MOVE SOURCE, IDENTIFICATION NAME OF MOVE DESTINATION |
| NAME CHANGE | IDENTIFICATION NAME BEFORE A CHANGE, IDENTIFICATION NAME AFTER A CHANGE |
| DELETION | IDENTIFICATION NAME TO BE DELETED |

F I G. 1 4

| OPERATION TYPE | IDENTIFICATION INFORMATION OF UPDATE SOURCE | IDENTIFICATION INFORMATION OF UPDATE DESTINATION |
|---|---|---|
| ⋮ | ⋮ | ⋮ |
| MOVE | HostA.DomainA/ example/doc/TextA | HostB.DomainB/ example/doc/TextB |
| ⋮ | ⋮ | ⋮ |

⇐ HISTORY INFORMATION "Y"

| OPERATION TYPE | IDENTIFICATION INFORMATION OF UPDATE SOURCE | IDENTIFICATION INFORMATION OF UPDATE DESTINATION |
|---|---|---|
| ⋮ | ⋮ | ⋮ |
| MOVE | HostA.DomainA | HostB.DomainB |
| ⋮ | ⋮ | ⋮ |

⇐ HISTORY INFORMATION "Z"

| OPERATION TYPE | IDENTIFICATION INFORMATION OF UPDATE SOURCE | IDENTIFICATION INFORMATION OF UPDATE DESTINATION |
|---|---|---|
| MOVE | HostA.DomainA/ example/doc/TextA | HostB.DomainB/ example/doc/TextB |
| MOVE | HostA.DomainA/ example/doc/TextC | HostA.DomainA/ example/doc/text |
| ⋮ | ⋮ | ⋮ |
| DELETION | HostA.DomainA/ doc/text | |
| ⋮ | ⋮ | ⋮ |

FIG. 19

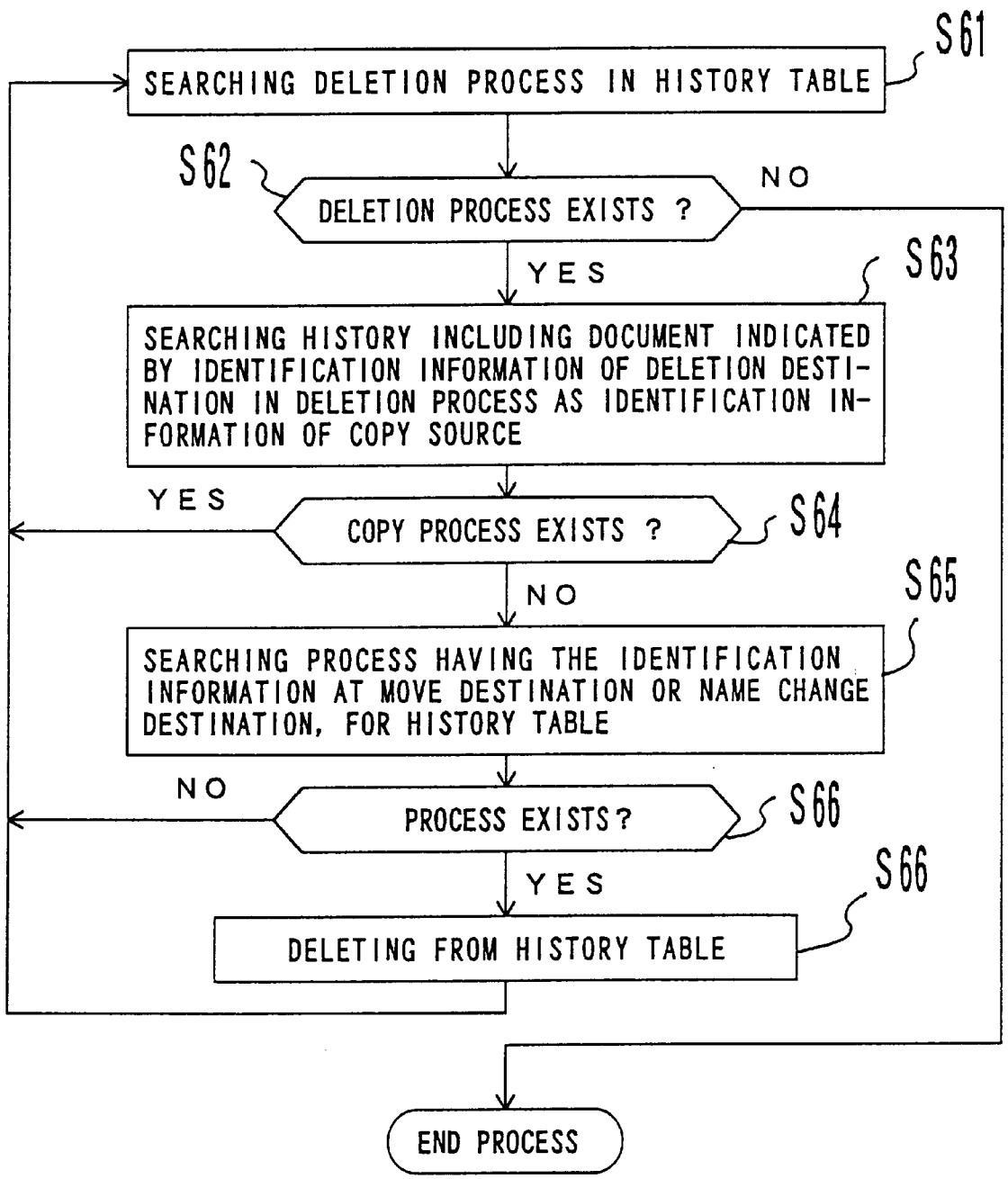
F I G. 2 0

DISTRIBUTED DOCUMENT MANAGEMENT SYSTEM

BACKGROUND OF THE INVENTION

1. Field of the Invention

The present invention relates to a distributed document management system for managing document data in computers, such as host computers, workstations and PCs, connected by a network (hereinafter abbreviated to hosts). Such a system locates and stores the distributed data in the hosts, more particularly the present invention relates to a distributed document management system for managing a document update history and a domain update history in order to maintain a consistency between link information of a document and an actual storage location of the document.

2. Related Art of the Invention

A document management system may distribute and locate document data in hosts in a network. A variety of types of document data (for example, partial text data such as a chapter, paragraph, etc., and components of a document such as a graphic data, image data, photo, etc.) may be generated by a plurality of document writers in a plurality of hosts. Such data are connected by links describing storage locations and identification names of the respective document data, so that a document can be generated by combining the plurality of document data.

FIG. 1 is a schematic diagram showing data distributed and stored in hosts in a network, and their links. As shown in this figure, data "b" through "d" which will be the components of document data "a" stored in a host A, are respectively and independently stored in hosts A through C, and connected by links. A document whose components are respectively and independently stored, and connected by links as described above, is called a compound document.

The component data of a document includes text, a graphic, image, video, etc. Additionally, there are a variety of link forms for the component data. A compound document includes an integrated document connected by a hierarchical link, hypertext connected by a non-hierarchical link, etc. An HTML document is one type of compound document.

A link between data is represented by combining a domain, host, directory path, file name, database name, etc., which indicate a storage location and identification name of data. When a compound document is generated, a reference for the document can be described by writing the link information to a referencing document. Assuming that the document data "a" (text data) is a referencing document in FIG. 1, the link information of the data "b" through "d" are written to the document data "a".

If document data are distributed and located in hosts in a network, the information about the storage locations and identification names of the document data are required to reference or retrieve the document data, etc. For example, a storage location of the document data is represented by using a hierarchical domain name which indicates the location of a host and host name, and a directory path indicating the storage location of the document data in the host, in a system which uses a file system to store document data. Additionally, a file name is used as the identification name.

FIG. 2 exemplifies such a domain, host, and file system. Here, assume that the identification information in the format "host name. domain name. domain name 1. •••. domain name n / directory name 1 / ••• / directory name n / file name" is used to describe the identification information. The identification information of text A shown in FIG. 2 can be represented as "Host A. Domain E. Domain A / Directory A / Directory B / Directory C / File A (Text A)".

If a compound document is generated by using the storage location and identification name of data as described above, the link information indicating the storage location and identification name of external document data is inserted into the compound document.

If document data is moved (in a host, or from host to host), if the name of the document data is changed, or if the name of the host or the name of the domain to which the host belongs is changed, the document data may sometimes not be retrieved, based on only the link information. This is because the storage location and identification name of document data are described as the link information in a compound document as described above.

If the storage location or identification name of document data indicated by link information is changed after such a compound document is generated, the link information relating to the document data to be changed, which is included in the compound document, must be updated. That is, all of the storage location and identification name indicated by the link information must be changed to the storage location and identification name after a change.

Accordingly, the following problems arise with the conventional method.

1) Since all items of related link information included in a compound document must be updated when document data is moved, or the name of the document data is changed, this process becomes complicated.

2) When the name of a host or the name of the domain to which the host belongs is changed, the link information which references the host and domain must be modified.

Since the above described process includes a search operation for document data in order to reference document data whose storage location or name is changed, it is difficult to implement. Therefore, if an access is unsuccessfully made, the retrieval of the document data is forced to be aborted.

SUMMARY OF THE INVENTION

It is therefore an object of the present invention to allow document data to be retrieved without fail, even if a variety of operations are performed for distributed and located document data.

According to one feature of the present invention, each host or each domain collects/manages history information of operations such as a move, or name change of document data structuring a compound document, or a change of a host or domain, etc., and an access to the changed document data can be enabled by referencing the history information, and examining the location of the corresponding document data, when an access to the document data based on the link information included in the compound document (document data) is unsuccessfully made.

Accordingly, even if the storage information of the document data is updated, new identification information which is updated from the identification information of the corresponding document data, can be obtained by making an inquiry to a history manager or a domain manager, without modifying the link information included in the compound document, and the updated document data can be retrieved. Furthermore, an increase in the amount of data stored in a history table can be suppressed by automatically searching and deleting unnecessary information in a table storing the history information. As a result, the efficiency of the search process can be prevented from being reduced.

BRIEF DESCRIPTION OF THE DRAWINGS

FIG. 7 exemplifies operation types and target identification information;

FIG. 8 exemplifies the structure of a history table;

FIGS. 12A and 12B are schematic diagrams showing relationships between domains and hosts;

FIG. 13 exemplifies the structure of a history table;

FIG. 14 exemplifies operation types and target identification information;

FIG. 19 exemplifies a history information deletion process in a history table; and FIG. 20 is a flowchart showing the history information deleting process.

DESCRIPTION OF THE PREFERRED EMBODIMENTS

Figure 1:
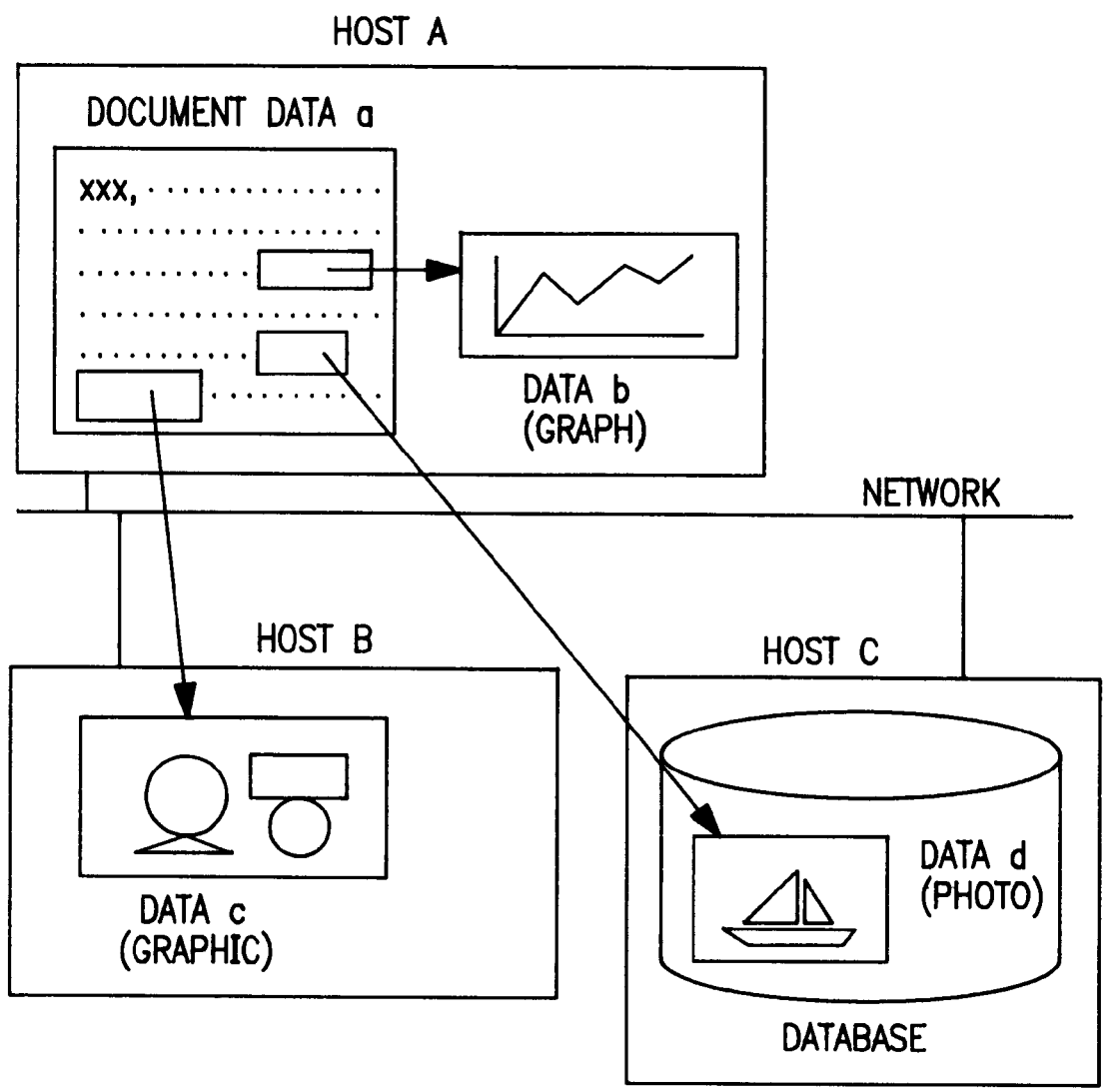
FIG. 1 exemplifies document data distributed and located in a network (Prior Art)
Figure 2:
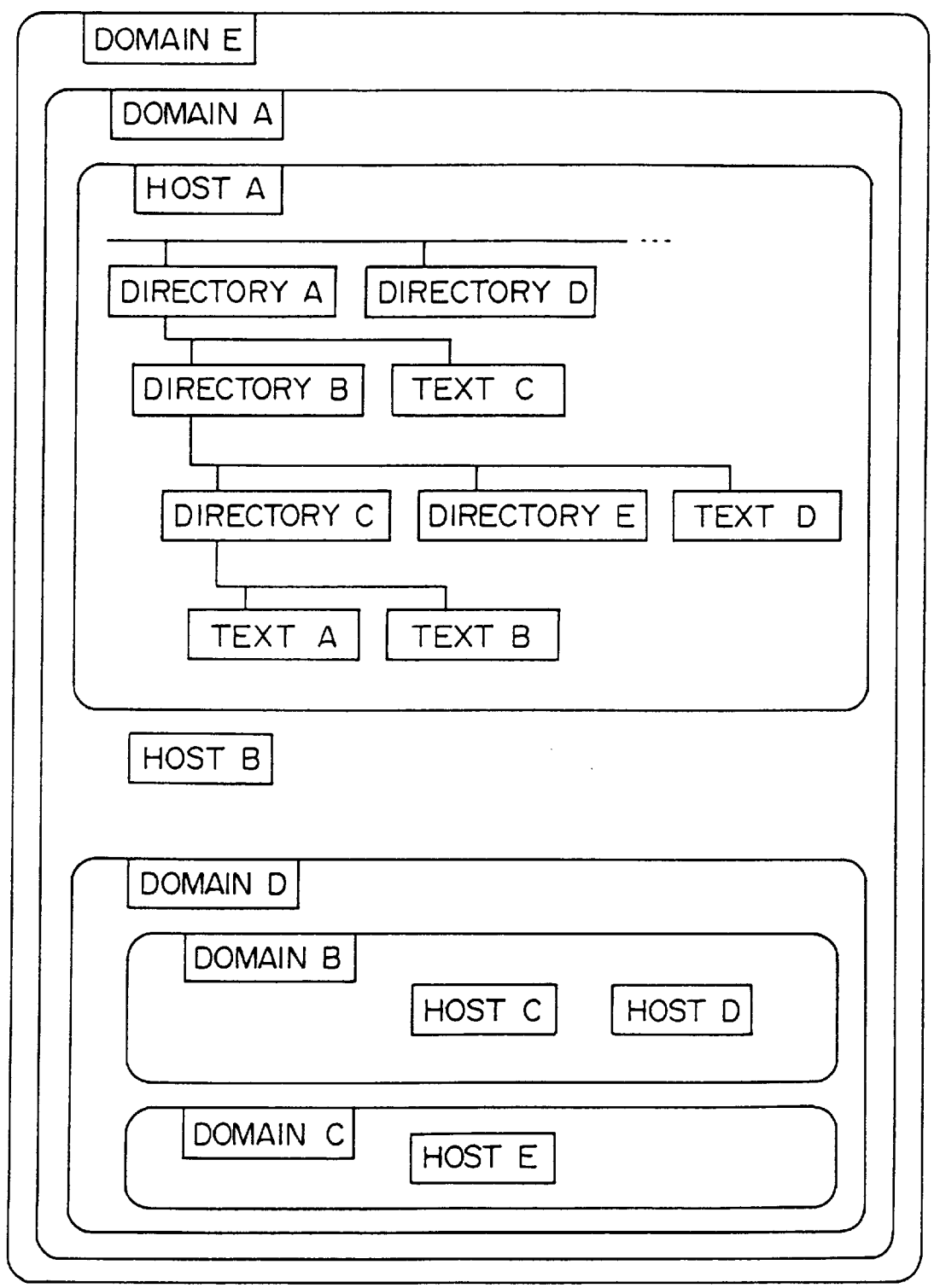
FIG. 2 exemplifies domains, hosts, and a file system (Prior Art)
Figure 3:
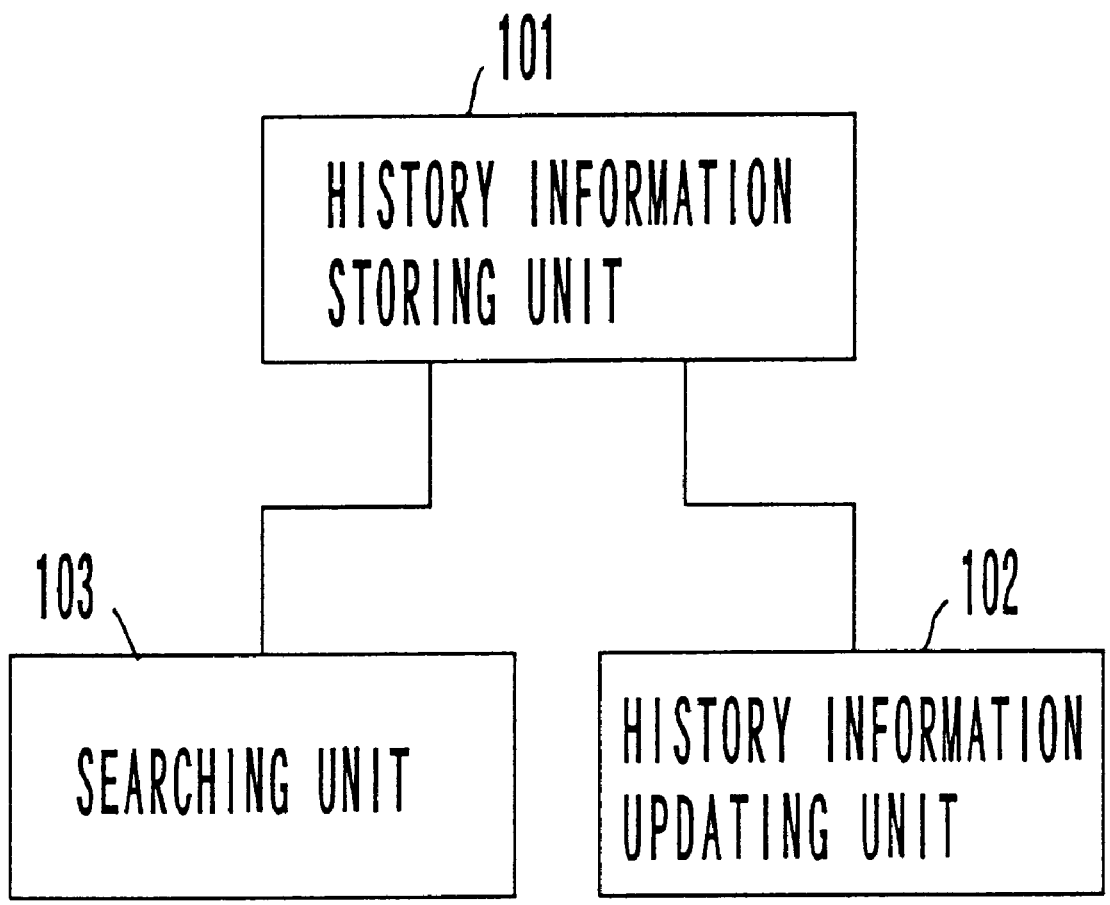
FIG. 3 is a block diagram showing the configuration of a distributed document management system according to a first embodiment of the present invention.

FIG. 3 is a block diagram showing the configuration of a distributed document management system according to the first embodiment of the present invention.

In this figure, a history information storing unit 101 stores access information of document data. A history information updating unit 102 corresponds (i.e. correlates) access information before a change to access information after the change, and stores this information in the history information storing unit 101 when the access information of the document data is changed. A searching unit 103 retrieves the document data based on the correspondence between the access information before a change and the access information after the change, which are stored in the history information storing unit 101.

For example, if document data is deleted, the history information updating unit 102 stores the identification name of the deleted document in the history information storing unit 101.

If document data is moved, the history information updating unit 102 stores move source and destination of the document data in the history information storing unit 101.

If the name of document data is changed, the history information updating unit 102 stores the name before the change and the name after the change in the history information storing unit 101.

If document data is divided, the history information updating unit 102 stores an original source and division destinations of the document data in the history information storing unit 101.

If document data are merged, the history information updating unit 102 stores original sources and a merging destination of the merged document data in the history information storing unit 101.

Accordingly, if the searching unit 103 fails to retrieve the document data due to a change of the name or storage location of the document data, it can identify the name and storage location of the document data after the change, by referencing the history information storing unit 101. As a result, the target document data can be retrieved.

Figure 4:
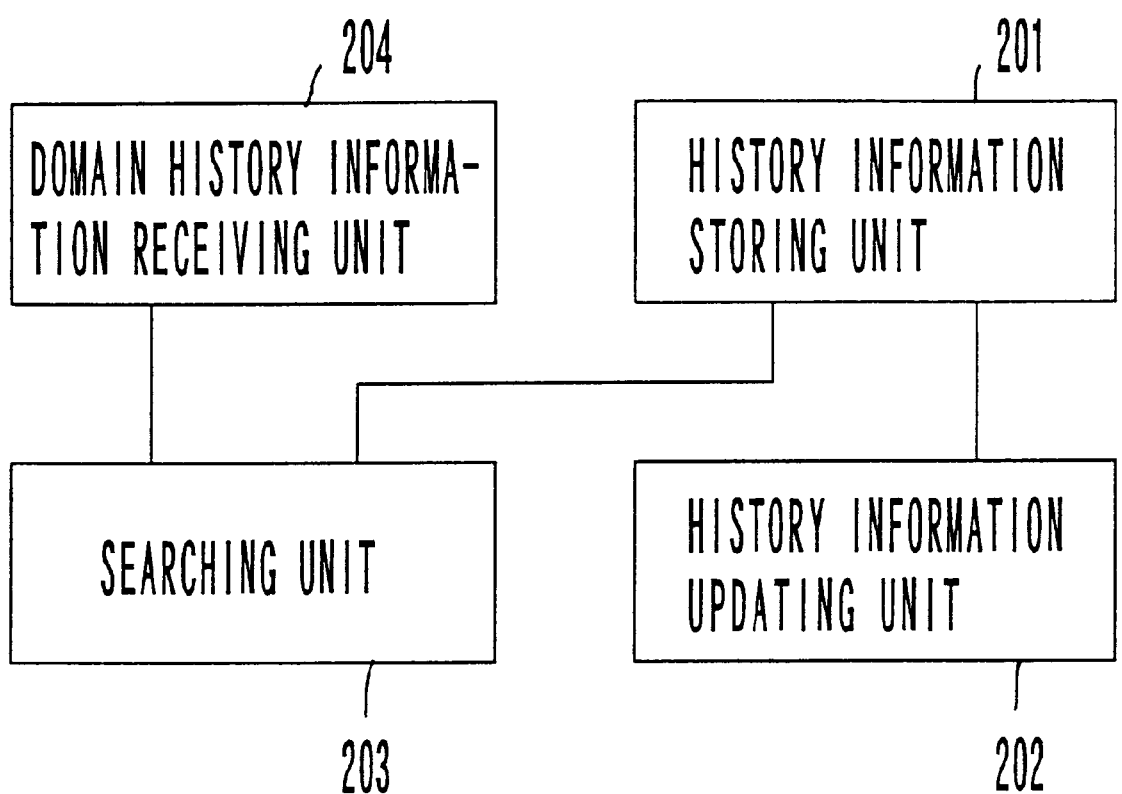
FIG. 4 is a block diagram showing the configuration of the distributed document management system according to a second embodiment of the present invention.

FIG. 4 is a block diagram showing the configuration of the distributed document management system according to the second embodiment of the present invention.

In this figure, a history information storing unit 201 stores access information of document data. A history information updating unit 202 corresponds access information before a change to access information after the change, and stores this information in the history information storing unit 201. A searching unit 203 retrieves the document data based on the correspondence between the access information before a change and the access information after the change, which are stored in the history information storing unit 201. A domain history information receiving unit 204 receives the access information of the document data via a communications line when the document data is retrieved.

For example, if a management device for managing document data is removed, the domain history information receiving unit 204 receives the identification name of the removed management device.

If the management device for managing document data is changed, the domain history information receiving unit 204 receives the identification name of the management device before a change and the identification name of the management device after the change.

If the searching unit 103 cannot retrieve the target document data due to a change of the management device for managing document data, even though it references the history information storing unit 101, it can retrieve the target document data by receiving the domain history information. This is because the identification name of the management device for managing document data after a change can be retrieved.

Figure 5:
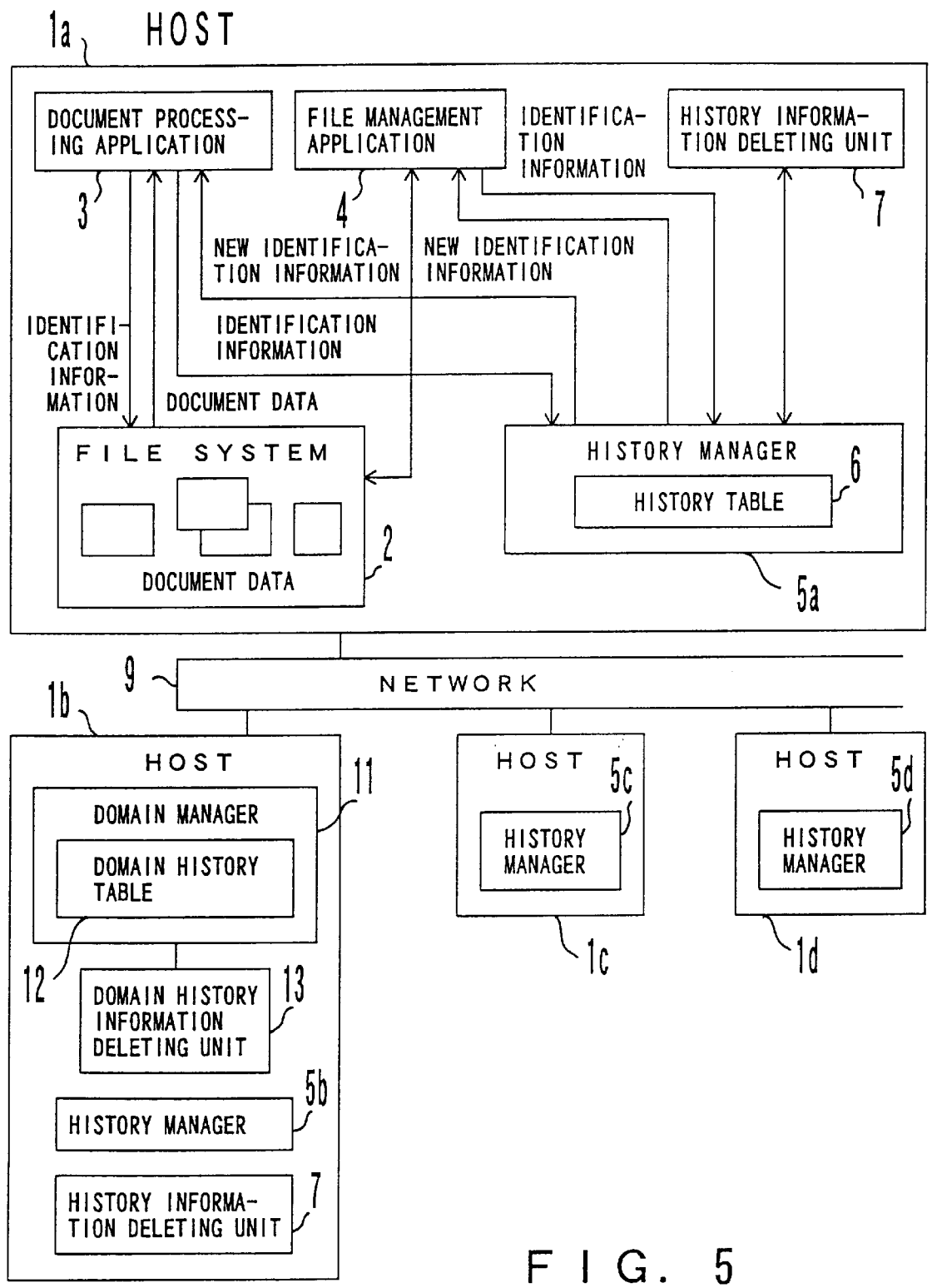
FIG. 5 is a block diagram showing the configuration of the distributed document management system according to a third embodiment of the present invention.

FIG. 5 is a block diagram showing the configuration of the distributed document management system according to the third embodiment of the present invention.

In this figure, hosts 1a through 1d comprise history managers 5a through 5d, each of which is a history information managing unit, comprising a history table 6 which is a history information storing unit, and a history information deleting unit 7, in order to collect and manage history information. Additionally, the host 1b comprises a domain manager 11 which is a domain history information managing unit, a domain history table 12 which is a domain history information storing unit, and a domain history information deleting unit 13, in order to collect and manage domain history information.

Each of the hosts 1a through 1d is composed of a CPU, memory, etc. They can be interconnected via a network 9. A file system 2 is intended to store and manage document data, etc., and is a subsystem of an operating system which provides a capability for accessing a file to an application program, etc.

A document processing application 3 is intended to perform operations such as an editing, display, or printing operation, etc., for document data stored in the file system 2. If an operation such as a retrieval operation for document data, which is requested to the file system 2, is unsuccessfully performed, the document processing application 3 transmits the identification information (storage location and identification name) of the document data to the history manager 5a. Application 3 obtains new identification information of corresponding document data from the history manager 5a, and again performs the retrieval operation for the document data.

A file management application 4 is an application for managing, for example, a file system of an operating system. This application performs operations for a file of document data stored in the file system 2.

For a document update process performed by the document processing application 3, and a document file update process performed by the file management application 4, the type of the file operation and the identification information of data to be operated upon are transmitted to the history manager 5a, and stored in the history table 6.

The history manager 5a manages the history table 6. Manager 5a searches the history table 6 according to a request to specify the identification information of document data, which is made from the document processing application 3. If the specified information is included in the history information, the history manager 5a notifies the document processing application 3, which is the request source, of new identification information corresponding to that identification information.

The history table 6 is intended to store history information. It stores the type of an operation performed for document data or a file stored in the file system 2 as the history information, and the identification information of the document data to be processed, etc.

The history information deleting unit 7 is intended to check information stored in the history table 6, and delete information which is logically unnecessary, such as a previously updated history of deleted document data, at a predetermined timing. The predetermined timing is implemented by an instruction issued from a user, a timer, a request from another processing unit, etc., although they are not shown in this figure.

The domain manager 11 in the host 1b is intended to manage the domain history table 12. It searches the domain history table 12 according to a request to specify the identification information of a domain. Manager 11 notifies the request source of new identification information of the host or domain obtained from the result of the search.

The domain history table 12 is intended to store the domain history information. The domain history information is information for identifying the type of an operation for changing a domain, the identification information (the host name) of a host connected via the network 9, and the name of a domain (a set of hosts).

The domain history information deleting unit 13 is intended to delete information which is logically unnecessary by checking the information stored in the domain history table 12, at a predetermined timing.

If data of a corresponding document is retrieved for the file system 2 from the document processing application 3 in order to retrieve the document data according to link information in a reference or update process of a compound document, the file system 2 searches the document data according to the identification information in the link information of the document data, which is specified by the document processing application 3. If the retrieval of the document data is unsuccessfully performed due to a move of a storage location, or a change of the name of the document data to be searched, the document processing application 3 receives the notification that the search was unsuccessful, and passes the identification information of that document data to the history manager 5a.

The history manager 5a searches for the history information in the history table 6 based on the passed identification information, and returns the new identification information of the document data obtained as the result of the search, to the document processing application 3. The document processing application 3 notifies the file system 2 of the new identification information obtained from the history manager 5a, so that the file system 2 performs a search based on the new identification information, retrieves the corresponding document data, and passes the retrieved data to the document processing application 3.

As described above, even if an update process such as a move or a change of a name of document data, etc. occurs, an access to the document data can be made without modifying the link information of the document data included in the compound document. This is because the history manager 5a manages the updated history information. Even when document data is distributed or merged, the document data expected to be the closest to the original document data can be retrieved based on the history information.

Furthermore, the domain manager 11 hierarchically manages change information about hosts in each domain, so that link information in a compound document need not be modified even if a host or domain is changed.

The history information deleting unit 7 or the domain history information deleting unit 13 automatically extracts and deletes the information which is logically unnecessary in the history table 6 storing the history information, or in the domain history table 12 storing the domain history information. Therefore, the amount of data stored in the table can be reduced, and the efficiency of the search process can be prevented from being lowered.

Figure 6:
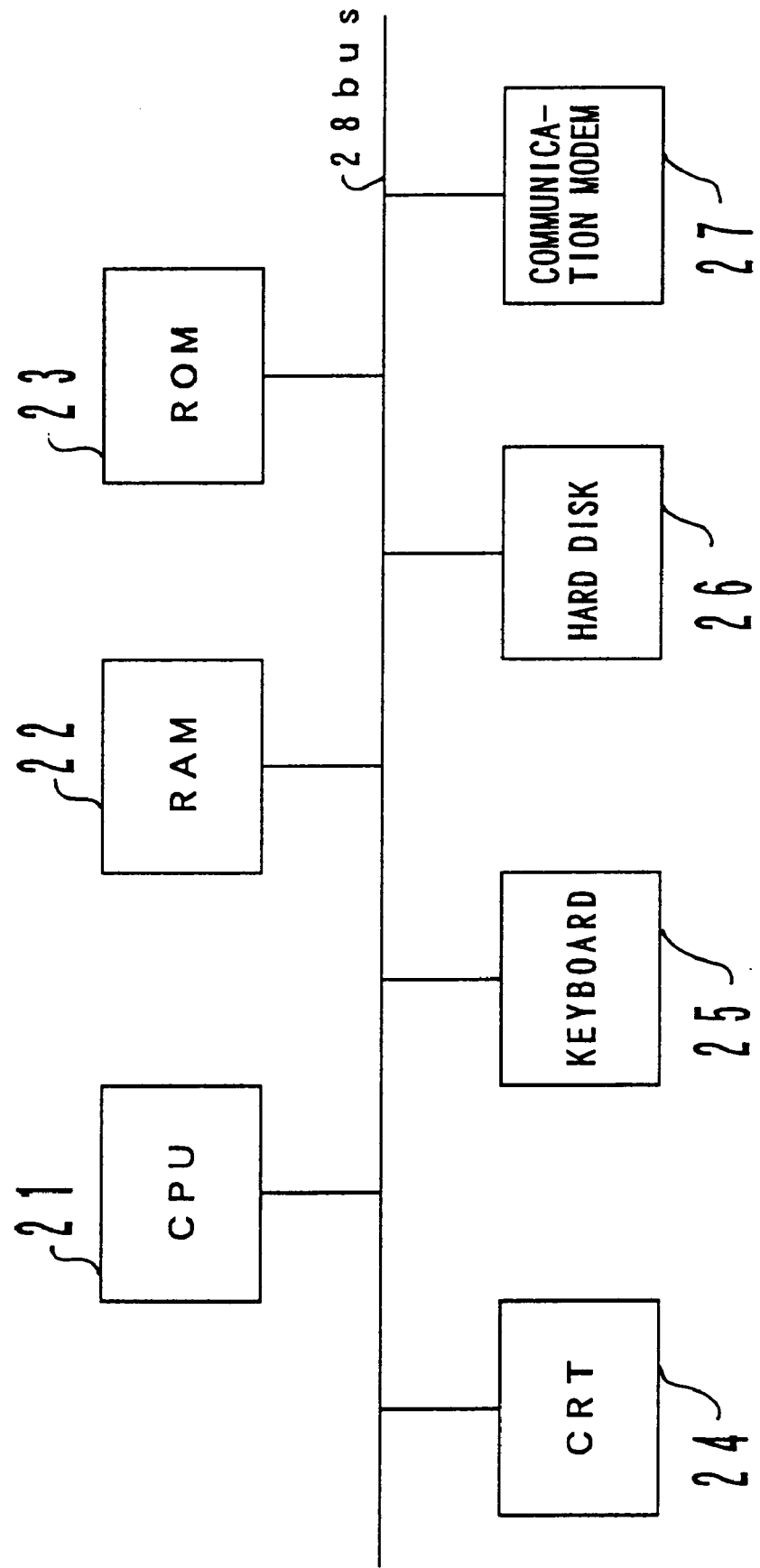
FIG. 6 is a block diagram exemplifying the system configuration of a host 1 shown in FIG. 5.

FIG. 6 is a block diagram exemplifying the system configuration of the hosts 1a through 1d shown in FIG. 5.

In this figure, a CPU 21, RAM 22, ROM 23, CRT 24, keyboard 25, hard disk 26, and a communication modem 27 are connected via a bus 28.

Document data input from the keyboard 25, or a scanner, etc., is stored on the hard disk 26, and displayed on the CRT 24 depending on need. The ROM 23 stores a program for controlling the CPU 21. The CPU 21 stores history information of a process performed for the document data in the RAM 22, when the document data is moved or its name is changed. Additionally, the CPU 21 searches the document data by referencing the history information when it retrieves the document data which is moved, or whose name is changed, from the hard disk 26.

The CPU 21 receives the domain history information about a domain change via the communication modem 27.

It searches the document data by referencing the domain history information, when retrieving the document data to which the domain change is made from the hard disk 26.

Provided below is the explanation about a process for storing updated history information of document data which is distributed and located in hosts, and a process for searching document data.

FIG. 7 exemplifies an operation type and its target identification information, which are registered by the history manager 5a. The operation type includes move, name change, deletion, copy, division, merging operations, etc. The history manager 5a registers update source identification information, update destination identification information, etc. as target identification information predetermined for each of the operations. For example, move source identification information and move destination identification information are registered for the move operation. The identification information is information generated by combining a directory path, storage location such as a server name, etc, file name, and an identifier such as a data identifier.

FIG. 8 exemplifies the structure of the history table 6. The history manager 5a registers the type of an operation; and target identification information such as the update source identification information and update destination identification information, etc. of the target, which relate to a link of a compound document, and are notified from the document processing application 3, file management application 4, etc., to the history table 6 as the history information.

The information in the first line of the history table shown in FIG. 8 indicates that the document data is moved from "/Doc/TextC" to "/New/TextD". Additionally, the information in the second line indicates that the name of the document data is changed from "/Doc/TextA" to "/Doc/TextB".

Figures 9A, 9B:
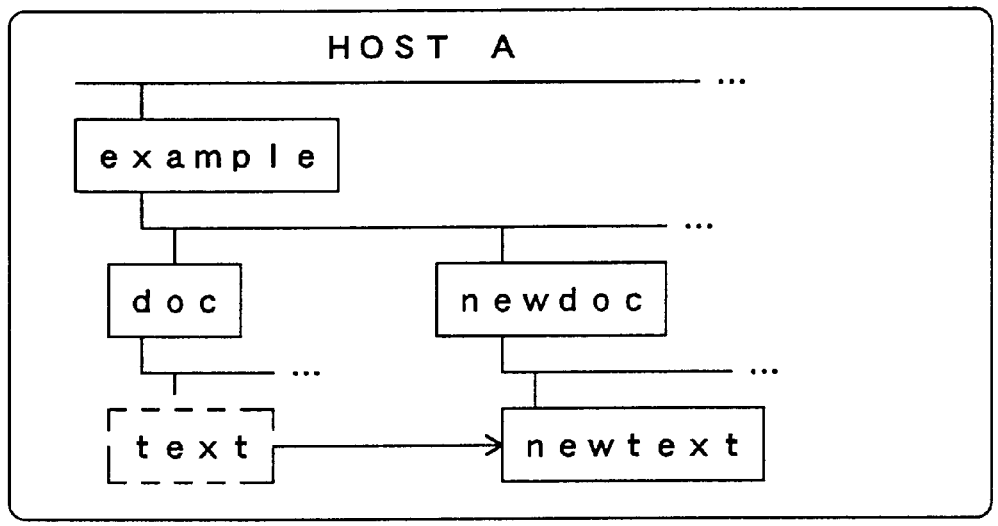
FIGS. 9A and 9B are schematic diagrams for explaining a move of document data.

Provided next is the explanation about a process for storing history information and a process for searching document data when the document data is moved, by referring to FIGS. 9A and 9B. FIG. 9A exemplifies the case in which document data is moved, while FIG. 9B exemplifies the history table after the document data is moved.

As shown in FIG. 9A, the document data in a compound document is moved from "/example/doc/text" to "/example/newdoc/newtext" by using the file management application 4 in the host A.

The file management application 4 notifies the history manager 5a that the document data is moved from "/example/doc/text" to "/example/newdoc/newtext". Then, the history manager 5a adds the history information "X" to the history table 6 as shown in FIG. 9B.

When the document processing application 3 retrieves the document data "/example/doc/text" thereafter, it searches the document data in the file system 2 by using the identification information "/example/doc/text" before the move. Since the document processing application 3 cannot find the corresponding document data, it specifies the identification information "/example/doc/text" of the document data, and issues a search request to the history manager 5a.

The history manager 5a searches the history table 6, and returns the information that the document data was moved from "/example/doc/text" to "/example/newdoc/newtext", to the document processing application 3 according to the history information "X".

The document processing application 3 receives this information, and performs the retrieval operation of "/example/newdoc/newtext" in the file system 2. With this operation, an access to required document data after a move can be realized.

Figure 10:
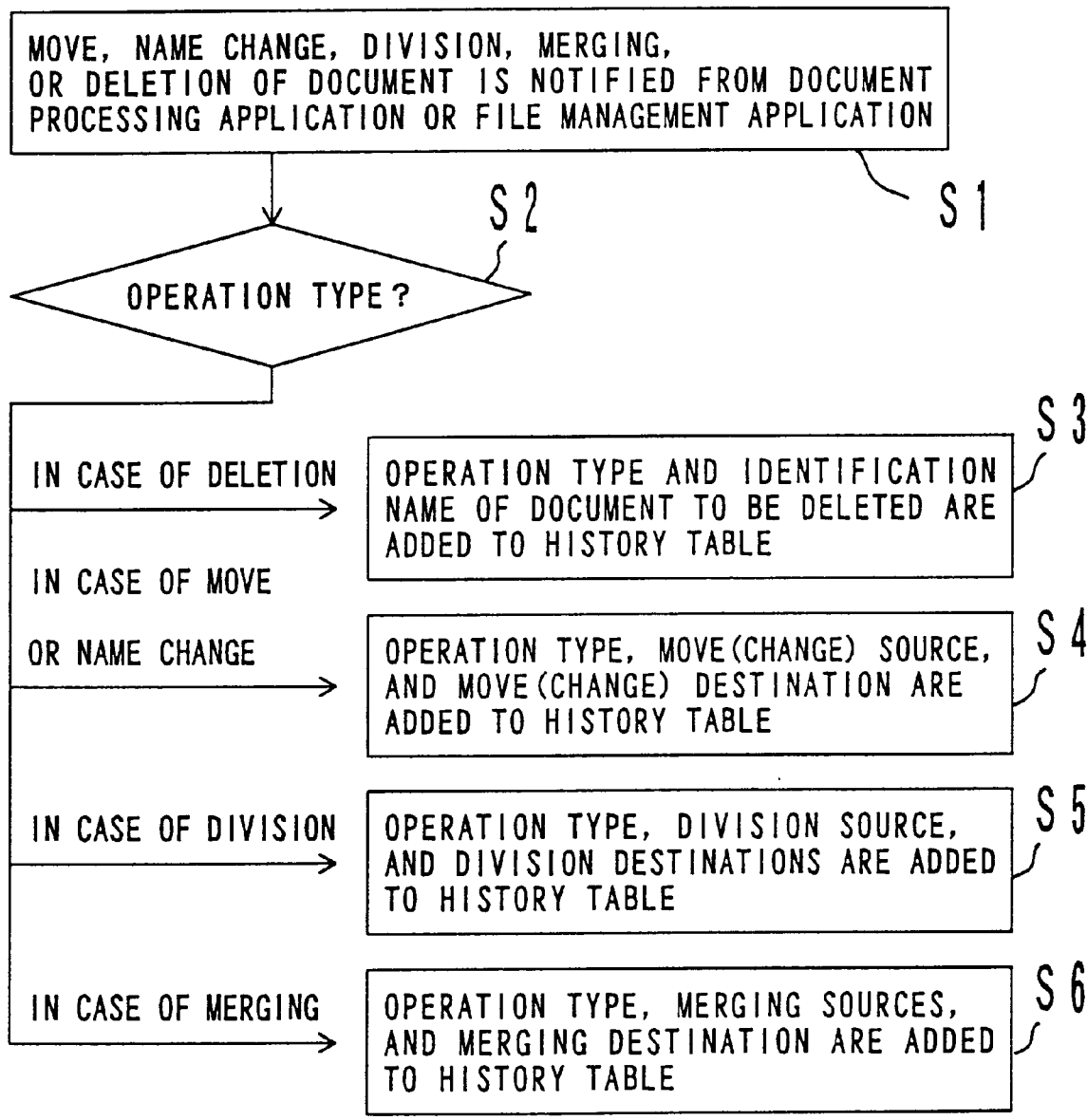
FIG. 10 is a flowchart showing a history table generation process.

FIG. 10 is a flowchart showing the process for generating the history table 6 shown in FIG. 5.

In this figure, the history manager 5a is notified from the document processing application 3 or the file management application 4 that a document is moved, divided, merged, deleted, or its name is changed, in step S1.

Then, the history manager 5a determines the type of the operation in step S2. If the type of the operation is determined to be the deletion of the document, the process goes to step S3. If the type of the operation is determined to be the move of the document or the change of the name of document, the process goes to step S4. Or, if the type of the operation is determined to be the division of the document, the process goes to step S5. If the type of the operation is determined to be the merging of the document, the process goes to step S6.

In step S3, the type of the operation, and the identification name of the document to be deleted are added to the history table 6.

In step S4, the type of the operation, and move source and destination of the document are added to the history table 6 when the document is moved, while the type of the operation, and change source and destination of the document name are added to the history table 6 when the document name is changed.

In step S5, the type of the operation, and division source and division destinations of the document are added to the history table 6.

In step S6, the type of the operation, merging sources and destination of the document are added to the history table 6.

Figure 11:
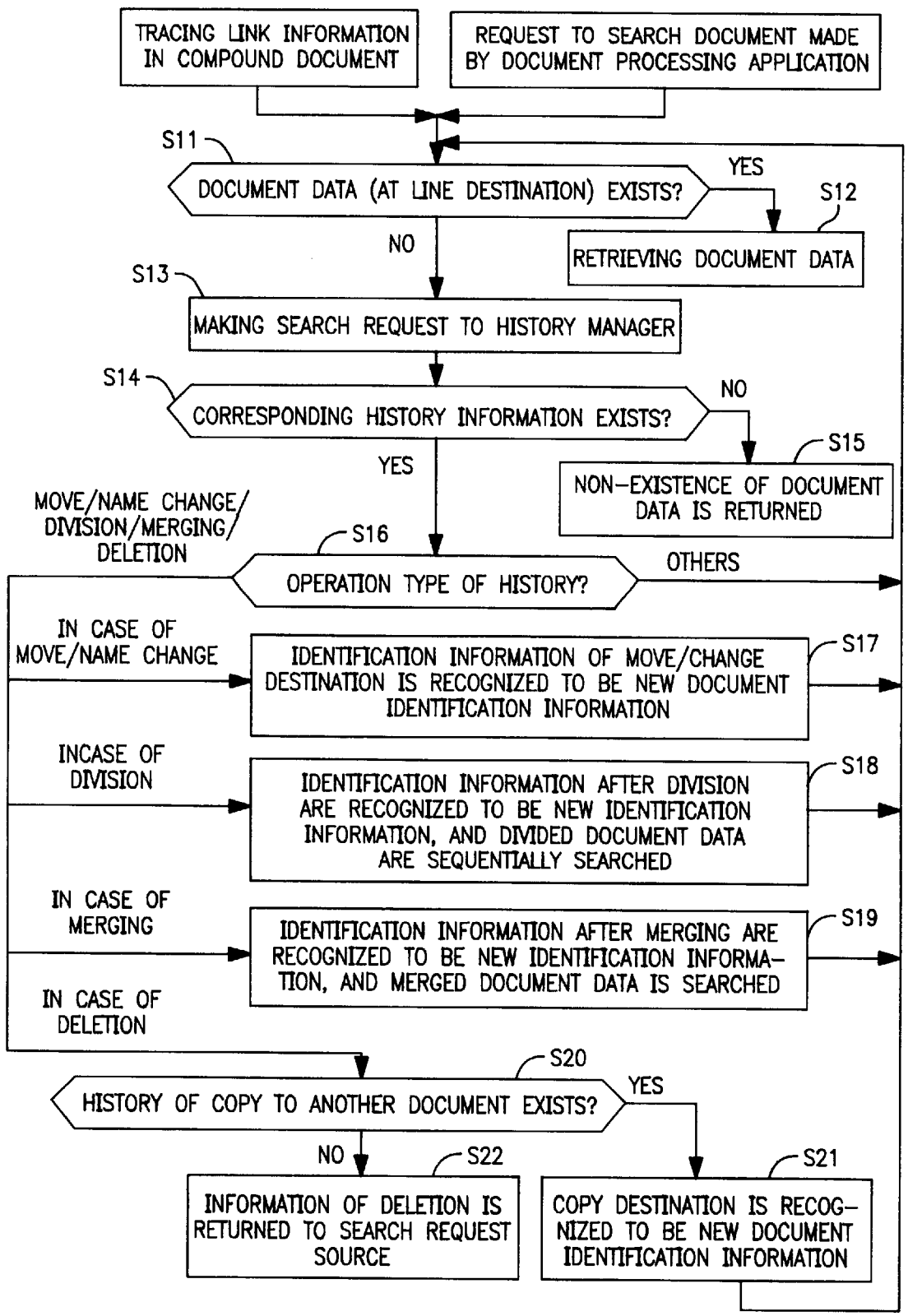
FIG. 11 is a flowchart showing a search process.

FIG. 11 is a flowchart showing a search process for retrieving document data using the history manager 5a.

In step S11, the file system 2 determines whether or not document data exists in a link destination, when the link information in a compound document is traced, or when a request to search a document is made by the document processing application 3. If "YES", the process in step S12 is performed. If "NO", the process in step S13 is performed.

In step S12, the target document data at the link destination is retrieved based on the identification information, and this retrieval operation is determined to be successful.

If the retrieval of the document data is unsuccessfully performed, the document processing application 3 makes a request to search the identification information of the corresponding document data to the history manager 5a in step S13.

In step S14, the history manager 5a searches the history table 6 in order to check if the corresponding history information exists. If "NO", the process in step S15 is performed. If "YES", the process goes to step S16.

In step S15, the history manager 5a notifies the document processing application 3 that no corresponding document data exists. The document processing application 3 then performs an error process such as outputting a message conveying that no corresponding document data exists, etc., upon receipt of the notification. This error process is similar to that of the conventional technique.

If the corresponding history information exists in the history table 6, the operation type of the history in the corresponding history information is determined in step S16. If the operation type is a move or a name change, the process in step S17 is performed. If the operation type is division of a document, the process in step S18 is performed. If the operation type is merging of documents, the process in step S19 is performed, if the operation is deletion, the process goes to step S20. If the operation type is other than those described above, the process goes back to step S11.

In step S17, the identification information of a move destination or a name change destination (move destination identification information/identification information after a change) is recognized as the new document identification information.

In step S18, the identification information after division (division destination identification information) is defined as the new identification information, and divided document data are sequentially searched.

In step S19, the identification information after merging (merging destination identification information) is recognized as the new identification information, and the corresponding document data is searched.

In step S20, the history table 6 is further searched by using the identification information of the deleted document data, in order to determine whether or not the history table 6 includes a history of a copy operation performed for another document having the same identification information. If "YES", the process goes to step S21. If "NO", the process goes to step S22.

In step S21, the identification information of the copy destination is recognized as the new identification information.

In step S22, the information that the document data is deleted is returned to the search request source.

Provided next is the explanation about a process for storing updated history information of document data which is distributed and located in a network, and a process for searching document data.

To manage documents distributed in a network, the identification information of the document data distributed, located, and stored in the network are described by adding the domain information, such as the information for identifying a host (host name), and the information for identifying a domain which is a set of hosts (domain name), in addition to the above described history information of the document data. The domain is hierarchically defined according to a set of hosts and domains.

FIGS. 12A and 12B exemplify relationships between hosts and domains. As shown in FIG. 12A, a domain is composed of one or a plurality of hosts or subdomains. One host in each of the subdomains includes a domain manager (DM) as a domain management host. Each of the hosts includes a history manager, and stores document data, etc.

In FIG. 12B, if Domain A includes Host A and Domain B includes Host B, the identification information of Text A in the document data stored in the directory Doc in Host A is "HostA. DomainA/Doc/TextA". If Text A is moved to a directory New in Host B. the identification information of the move destination will be "HostB. DomainB/New/TextA".

As described in the preceding paragraph, the history manager 5a registers the operation type and the target identification information to which such identification information of the host and domain is added, to the history table 6.

FIG. 13 exemplifies the structure of the history table 6. The history manager 5a registers the operation type notified from the document processing application 3 or the file management application 4, etc. in its own host la, and target identification information such as change source identification information, change destination identification information, etc. of the target, to the history table 6 as the history information. The identification information of the stored document is represented, for example, in a format "domain$_1$. •••, domain$_N$. host / directory $_1$ / directory $_2$ /•••/ directory $_M$ / file name".

The information in the first line shown in FIG. 13 indicates that the document data is moved from "HostA. DomainA/Doc/TextA" to "HostB. DomainB/New/TextA". The information in the second line indicates that the name of the document data is changed from "HostC/Doc/TextA" to "HostC/Doc/TextB".

To prevent identification information from being undetected due to a change of the identification information in the network 9, which accompanies the operation for updating the hosts 1a through 1d, such as a deletion or move of any of hosts 1a through 1d, and a change of a host name, etc., the host 1b comprises the domain manager 11 for storing and managing the updated history of the hosts 1a through 1d and subdomains, which are subordinate to the corresponding domain. The domain manager 11 is arranged in one of the hosts 1a through 1d structuring a domain. It registers an update history such as a move, name change, deletion, etc. of the hosts 1a through 1d and subdomains, which are subordinate to its own domain, to the domain history table 12.

FIG. 14 exemplifies operation types and target identification information, which are registered by the domain manager 11. The operation types include a move, name change, deletion, etc. The domain manager 11 registers change source identification information or change destination identification information, etc., as the target identification information predetermined for each of the operations. The identification information at this time is domain information and host name for a host, and domain information for a domain. The domain information is an identifier of a domain hierarchy which uniquely determines a domain.

Provided below is the explanation about a process for storing history information and a process for searching for document data, when the document data is moved from host to host, by referring to FIGS. 15A and 15B.

Figures 15A, 15B:
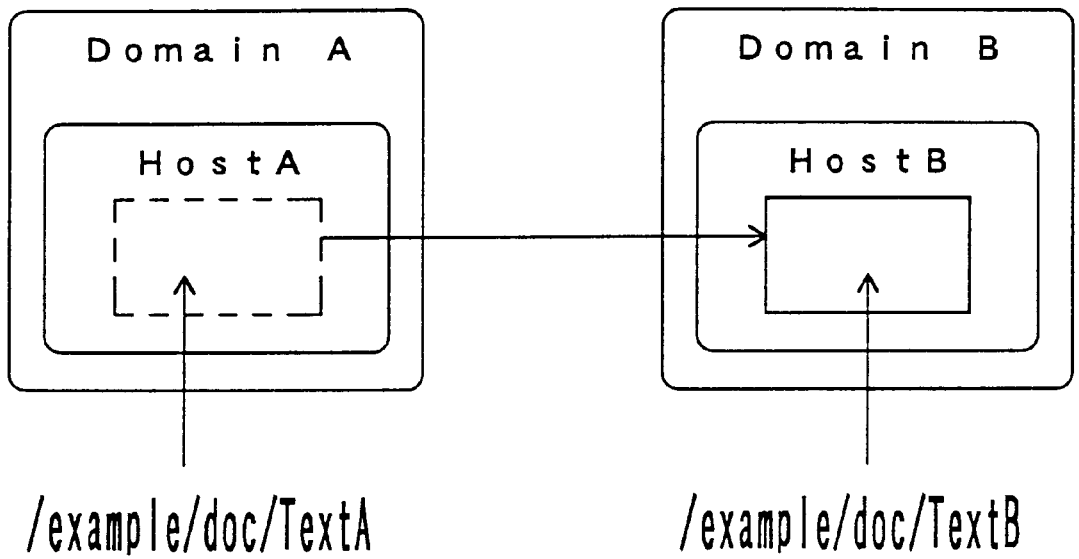
FIGS. 15A and 15B are schematic diagrams for explaining a move of document data from host to host.

FIG. 15A exemplifies a move of document data, while FIG. 15B exemplifies a history table after the document data is moved.

As shown in FIG. 15A, the document data in a compound document is moved from "/example/doc/TextA" to "/example/doc/TextB" in Host B in Domain B, by the document processing application in Host A in Domain A.

When the document processing application in Host A notifies the history manager that the document data is moved from "HostA. DomainA/example/doc/TextA" to "HostB. DomainB/example/doc/TextB", the history manager adds the history information "Y" to the history table as shown in FIG. 15B.

The process for retrieving the document data "HostA. DomainA/example/doc/TextA", which is performed by another document processing application, is described below. First of all, the document processing application searches for the document data "HostA. DomainA/example/doc /TextA" in the file system in Host A. However, the document processing application cannot find the corresponding document data.

Then, it makes a search request to the history manager. The history manager searches for the history table shown in FIG. 15B, and returns the information that the document data "HostA. DomainA/example/doc/TextA" has been moved to "HostB. DomainB/example/doc/TextB" to the document processing application, according to the history information "Y".

The document processing application receives this information, and performs the process for retrieving "/example/doc/TextB" from the file system in Host B.

Figures 16A, 16B:
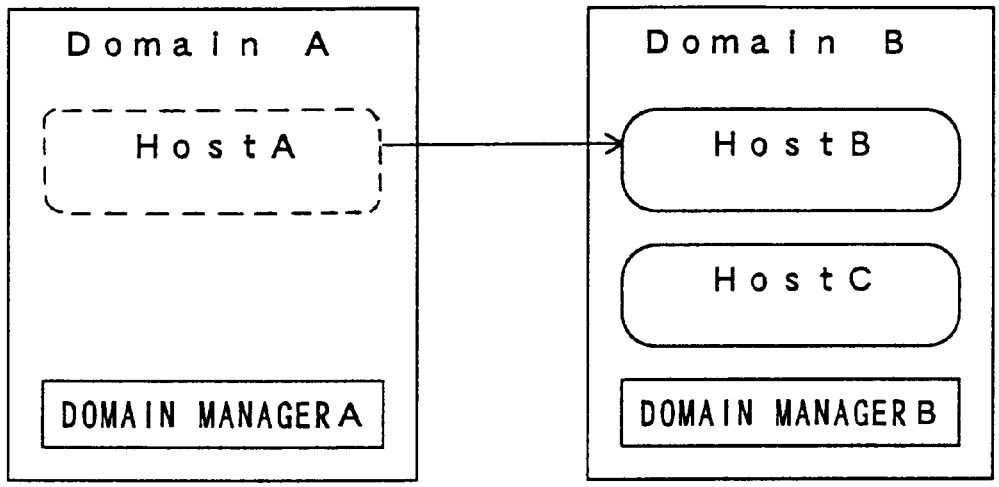
FIGS. 16A and 16B are schematic diagrams for explaining a move of a host.

Provided next is the explanation about a process for storing history information and a process for searching for a host, when a host moves from domain to domain, by referring to FIGS. 16A and 16B.

FIG. 16A exemplifies a move of a host, while FIG. 16B exemplifies a domain history table after the host has been moved.

Assume that HostA in Domain A is moved and changed to HostB in Domain B as shown in FIG. 16A.

If an operator or an application setting up a host notifies the domain manager that "HostA. DomainA" has been changed to "HostB. DomainB", the domain manager adds the history information "Z" to the domain history table as shown in FIG. 16B.

When the document processing application in HostA in Domain A retrieves the document data "HostA. Domain A/example/doc/TextA" there-after, this process is performed as follows. First of all, the document processing application searches for the document data "HostA. Domain A/example/doc/TextA" in the file system in Host A. However, Host A cannot be found because it has been moved. Accordingly, the document processing application makes a request to search for Host A to the domain manager.

The domain manager searches the domain history table shown in FIG. 16B, and returns the information that "HostA. DomainA" has been moved to "HostB. DomainB" to the document processing application, according to the history information "Z".

The document processing application receives this information, makes a request to search for the document data to Host B in Domain B, and retrieves the document data from the file system in the host at the move destination.

Figure 17:
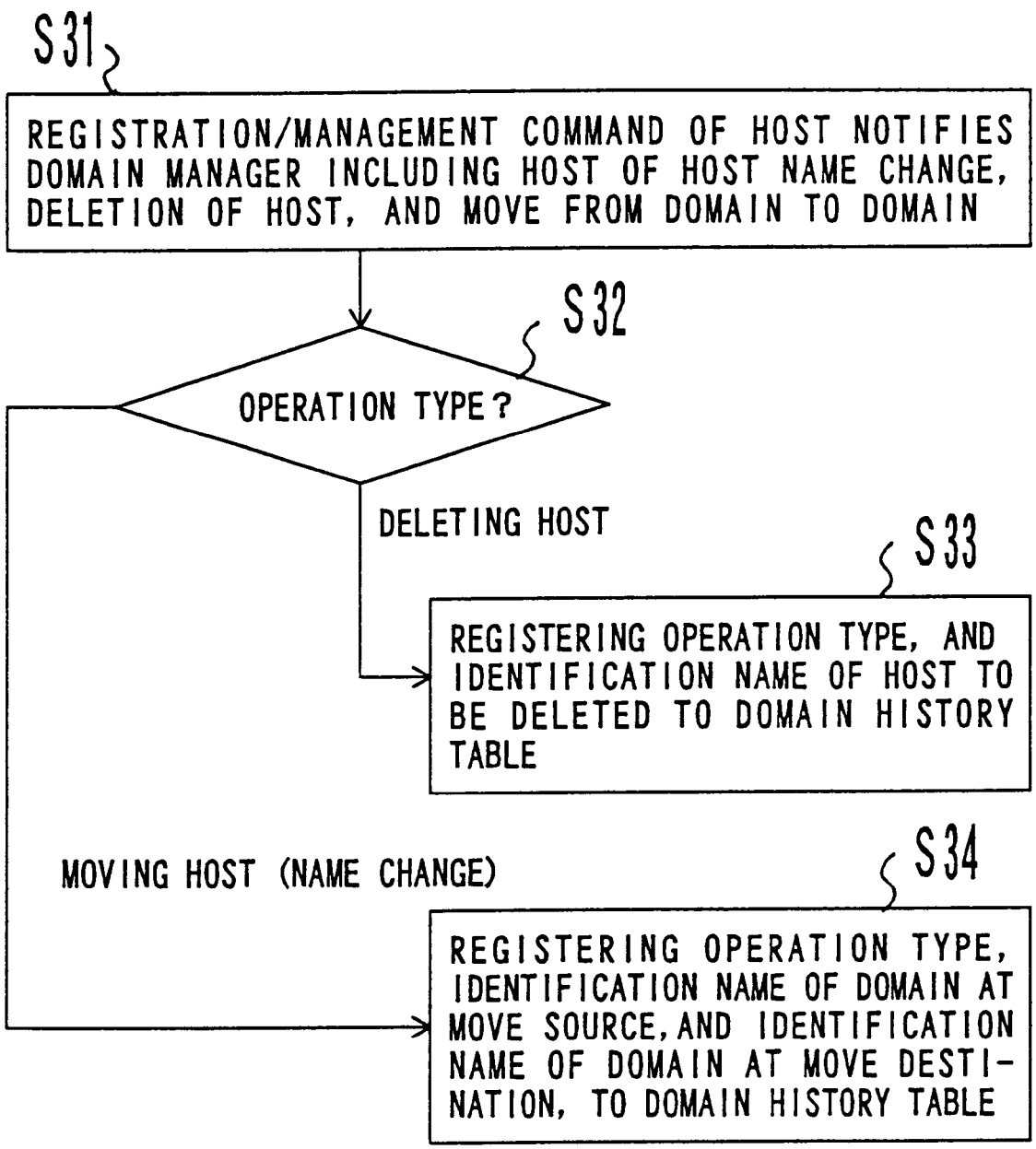
FIG. 17 is a flowchart showing a domain table generation process.

FIG. 17 is a flowchart showing a process for generating the domain history table 12 shown in FIG. 5.

In this figure, the information that the host name is changed, the host is deleted, or the host is moved from domain to domain, is notified to the domain manager 11 including the host, with the registration/management command of the host, in step S31.

Then, the domain manager 11 determines the type of the operation in step S32. If the type of the operation is determined to be the deletion of a host, the process goes to step S33. If the type of the operation is a change of the host name, or a move of the host, the process goes to step S34.

In step S33, the type of the operation and the identification name of the host to be deleted are added to the domain history table 12.

In step S34, the type of the operation, and the identification names of the domains at the move source and destination are added to the domain history table 12, if the host is moved. If the type of the operation is a change of the host name, the type of the operation, and the change source and destination of the host are added to the domain history table 12.

Figure 18:
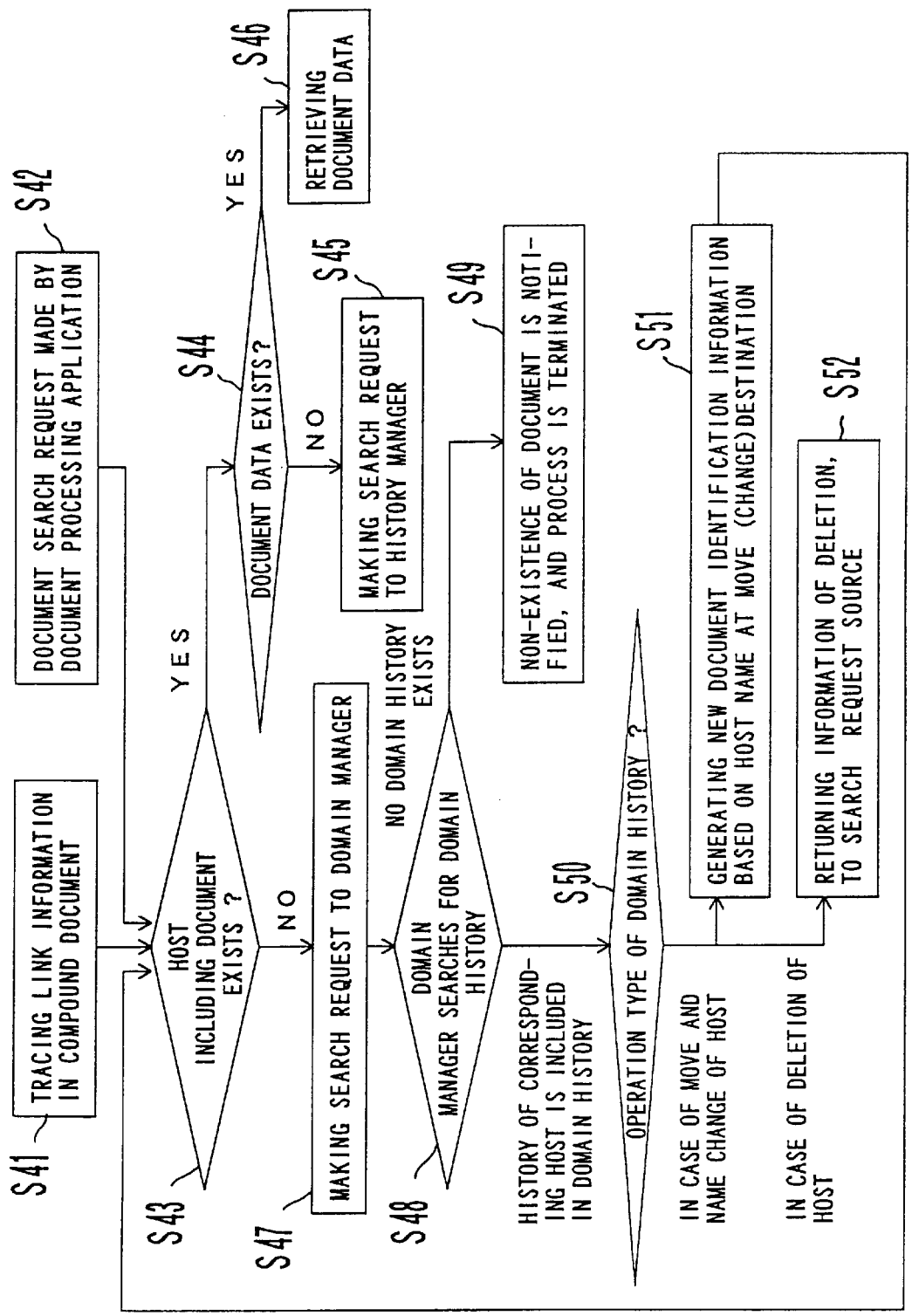
FIG. 18 is a flowchart showing a search process including a domain manager.

FIG. 18 is a flowchart showing a search process including the domain manager 11 shown in FIG. 5.

In this figure, if link information in a compound document is traced in step S41, or if a search request is made by the document processing application 3 in step S42, it is determined whether or not a host including the document exists in step S43.

If the host 1a includes the document to which the search request is made, it is determined whether or not the document data exists in step S44. If the document data exists in the file system 2, the process goes to step S46 where the document data is retrieved from the file system 2 based on the identification information from the document processing application 3.

If the document data does not exist in the file system 2, the process goes to step S45 where a search request is made to the history manager 5a. The history manager 5a reads the identification information after a change corresponding to the identification information before a change, which is transmitted from the document processing application 3 or the file management application 4, from the history table 6. The identification information after a change, which is read from the history table 6, is transmitted to the document processing application 3 or the file management application 4. Then, the document processing application 3 or the file management application 4 retrieves the document data from the file system 2 based on the identification information after a change.

If it is determined that there is no host including the document data in step S43, the process goes to step S47 where a search request is made to the domain manager 11.

Next, the domain manager 11 searches the domain history table 12 in step S48. If the domain history table 12 does not include the domain history of the corresponding host, the process goes to step S49 where it is notified that no document exists, and the process is terminated.

If the domain history table 12 includes the domain history of the corresponding host, the process goes to step S50 where the type of the operation in the domain history is determined. If the type of the operation in the domain history is a change of a host name, or the move of a host, the process goes to step S51. If the type of the operation in the domain history is the deletion of a host, the process goes to step S52.

If the type of the operation in the domain history is the move of a host in step S51, new document identification information is generated according to the host name at the move destination, and the process goes back to step S43. In step S51, if the type of the operation in the domain history is a change of a host name, new document identification information is generated according to the host name at a change destination, and the process goes back to step S43.

In step S52, the information indicating that the host is deleted is generated, and returned to the search request source.

Provided next is the explanation about a process for managing history information and domain history information.

Since the amount of updated information stored in the history manager or the domain manager gradually increases, the amount of stored data can be reduced and the search efficiency can be improved by deleting the information which is logically unnecessary, such as the previously-updated history, etc. of deleted document data.

A history information deleting unit 7 is intended to search history information in a history table periodically or by an instruction given by an operator, and delete the history information which becomes unnecessary.

Provided next is the explanation about a process for deleting updated history information of deleted document data, by referring to the example shown in FIG. 19.

The history information whose operation type is deletion is searched in the history table shown in FIG. 19, and the history information "N1" including the identification information of the deletion destination "HostA. DomainA/doc/text" is obtained. Furthermore, the identification information including "HostA. DomainA/doc/text" as the identification information of a copy source, is searched. If the corresponding identification information exists, the process is terminated, and the history information is not deleted. This is because the document at the copy destination which is copied before being deleted can be used for an access to the document at the deleted "HostA. DomainA/doc/text".

If no corresponding identification information exists, the identification information including "HostA. DomainA/doc/text" as the identification information of a move destination or of a name change destination, is searched. Then, the identification information "N2" corresponding to this information is deleted.

FIG. 20 is a flowchart showing a process for deleting history information.

In step S61, the history information deleting unit 7 searches for information whose operation type is deletion in the history table 6.

In step S62, it is determined whether or not the corresponding deletion process exits. If "YES", the process goes to step S63. If "NO", the process is terminated.

In step S63, the history information including the document data indicated by the identification information of the deletion destination in the deleting process as the identification information of a copy source, is searched.

In step S64, it is determined whether or not the corresponding copy process exists. If "NO", the process goes to step S65. If "YES", the process goes back to step S61.

In step S65, the history information having the identification information at a move destination or a name change destination, is searched in the history table 6.

In step S66, it is determined whether or not the history information of the corresponding process exists. If "YES", the process goes to step S67. If "NO", the process goes back to step S61.

In step S67, the corresponding history information is deleted from the history table 6.

Note that the domain history information deleting unit 7 also deletes unnecessary history information in the domain history table 12 in a similar manner.

What is claimed is:

1. A distributed document management method, comprising the steps of:
   changing access information of document data;
   generating correspondence information indicating a correspondence between access information before a change and access information after a change, and storing this correspondence information; and
   searching for the document data using correspondence information indicating a correspondence between the access information before a change and the access information after a change.

2. A computer-readable storage medium storing a program for controlling a computer which comprises the functions of:
   corresponding access information before a change to access information after a change, and storing these information; and
   searching for the document data based on a correspondence between the access information before a change and the access information after a change.

3. A computer-readable storage medium storing a program for controlling a computer which comprises the functions of:
   storing a history of identification information of document data which is distributed and managed by a plurality of host computers;
   searching for the document data based on specified identification information;
   reading out a history of the specified identification information, when a search for the document data based on the specified identification information is unsuccessfully performed;
   searching for the document data based on the history of the specified identification information;
   reading out a history of a domain managing the specified identification information, when the search for the document data based on the history of the specified identification information is unsuccessfully performed; and
   searching for the document data based on the history of the domain managing the specified identification information.

4. A distributed document management apparatus, comprising:
   history information storing means for corresponding access information before a change to access information after a change, and storing this information, when access information of document data is changed; and
   searching means for searching for the document data based on a correspondence between the access information before a change and the access information after a change, which are stored in said history information storing means.

5. The distributed document management apparatus according to claim 4, wherein when the document data is deleted, said history information storing means stores an identification name of the deleted document.

6. The distributed document management apparatus according to claim 4, wherein when the document data is moved, said history information storing means stores a move source and a move destination of the document data.

7. The distributed document management apparatus according to claim 4, wherein when a name of the document data is changed, said history information storing means stores a name before a change and a name after a change.

8. The distributed document management apparatus according to claim 4, wherein when the document data is divided, said history information storing means stores a division source and division destinations of the document data.

9. The distributed document management apparatus according to claim 4, wherein when document data are merged, said history information storing means stores merging sources and a merging destination of the document data.

10. The distributed document management apparatus according to claim 4, further comprising:
    history information receiving means for receiving access information of the document data via a communications line, when the document data is searched.

11. The distributed document management apparatus according to claim 10, wherein when a management device for managing the document data is removed, said history information receiving means receives an identification name of the removed management device.

12. The distributed document management apparatus according to claim 10, wherein when a management device for managing the document data is changed, said history information receiving means receives an identification name of the management device before a change and an identification name of the management device after a change.

13. A distributed document management apparatus, comprising:

history information storing means for corresponding access information before a change to access information after a change, and storing this information, when access information of the document data is changed;

domain history information storing means for storing a history of a domain in which a plurality of host computers are grouped;

first searching means for searching for the document data based on a correspondence between the access information before a change and the access information after a change, which are stored in said history information storing means; and second searching means for searching for the document data based on the history of the domain stored in said domain history information storing means, when said first searching means fails to retrieve the document data.

14. The distributed document management apparatus according to claim 13, wherein when a host computer for managing the document data is removed, said domain history information storing means stores an identification name of the removed host computer.

15. The distributed document management apparatus according to claim 13, wherein when a host computer for managing the document data is changed, said domain history information storing means stores an identification name of the host computer before a change and an identification name of the host computer after a change.

16. A distributed document management system for managing documents composed of document data which are distributed, located, and stored in a plurality of host computers interconnected over a network, and are connected by links, comprising:

domain history information storing means for storing history information of domain change information about a domain in which host computers storing document data are grouped; and domain history information managing means for searching said domain history information storing means according to a request to specify identification information of the domain, and notifying identification information of a new domain corresponding to the identification information when the specified identification information of the domain is included in the history information, wherein when an access request source of the document data fails to retrieve the document data, the access request source notifies said domain history information managing means of the identification information of the domain having the document data, obtains identification information of a new domain, and retrieves the document data.

17. The distributed document management system according to claim 16, further comprising:

domain history information deleting means for automatically extracting and deleting information which is logically unnecessary from history information about domain change information stored in said domain history information storing means.

18. A distributed document management system for managing documents composed of document data which are respectively stored in computers, and connected by links, comprising:

history information storing means for storing history information of a process performed for document data, which includes a move or a name change of the document data; and history information managing means for searching said history information storing means according to a request to specify identification information of the document data, and notifying new identification information corresponding to the identification information when the specified identification information is included in the history information, wherein when an access request source of the document data fails to retrieve the document data, the access request source notifies said history information managing means of the identification information of the document data, obtains new identification information, and retrieves the document data.

19. The distributed document management system according to claim 18, further comprising:

history information deleting means for automatically extracting and deleting information which is logically unnecessary from the history information about the process of the document data stored in said history information storing means.

20. A distributed document management method, comprising the steps of:

storing a history of identification information of document data which is distributed and managed by a plurality of host computers, in each of the plurality of host computers;

storing a history of a domain in which the plurality of host computers are grouped, in one of the plurality of host computers in the domain;

searching for the document data based on specified identification information;

reading out a history of the specified identification information from any of the plurality of host computers, when a search for the document data based on the specified identification information is unsuccessfully performed;

searching for the document data based on the history of the specified identification information;

reading out the history of the domain managing the specified identification information from any of the plurality of computers, when the search for the document data based on the history of the specified identification is unsuccessfully performed; and searching for the document data based on the history of the domain managing the specified identification information.

* * * * *